(12) United States Patent
Hitchcock et al.

(10) Patent No.: US 12,094,074 B2
(45) Date of Patent: Sep. 17, 2024

(54) VOLUMETRIC HEAT MAPS FOR INTELLIGENTLY DISTRIBUTING VIRTUAL OBJECTS OF INTEREST

(71) Applicant: Sphere Entertainment Group, LLC., New York, NY (US)

(72) Inventors: Stephen Hitchcock, New York, NY (US); Emily Saunders, New York, NY (US)

(73) Assignee: Sphere Entertainment Group, LLC, New York, NY (US)

( * ) Notice: Subject to any disclaimer, the term of this patent is extended or adjusted under 35 U.S.C. 154(b) by 158 days.

(21) Appl. No.: 17/856,561

(22) Filed: Jul. 1, 2022

(65) Prior Publication Data

US 2024/0005618 A1    Jan. 4, 2024

(51) Int. Cl.
    *G06T 19/20* (2011.01)
(52) U.S. Cl.
    CPC .......... *G06T 19/20* (2013.01); *G06T 2200/24* (2013.01); *G06T 2219/2004* (2013.01)
(58) Field of Classification Search
    CPC .................. G06T 19/20; G06T 2200/24; G06T 2219/2004
    See application file for complete search history.

(56) References Cited

U.S. PATENT DOCUMENTS

| 2016/0364907 | A1* | 12/2016 | Schoenberg | ......... G02B 27/017 |
| 2018/0133599 | A1 | 5/2018 | Lang | |
| 2021/0150818 | A1 | 5/2021 | Dedonato et al. | |
| 2022/0157011 | A1* | 5/2022 | Youngquist | ............. G06T 15/20 |

FOREIGN PATENT DOCUMENTS

EP    3876112 A1    9/2021

OTHER PUBLICATIONS

International Search Report and Written Opinion directed to related International Application No. PCT/US2023/074872, mailed May 29, 2024; 14 pages.

* cited by examiner

*Primary Examiner* — Ryan R Yang
(74) *Attorney, Agent, or Firm* — Sterne, Kessler, Goldstein & Fox P.L.L.C.

(57) ABSTRACT

Disclosed herein are system, method, and computer program product embodiments for intelligently distributing virtual objects within a 3D virtual space using a voxel-based heat map. The approach is highly flexible and scalable, and a designer may guide the placement of virtual objects using parameters that reference the voxel-based heat map. This technique affords designers expansive creative control over a wide-array of scenarios that involve placing a virtual object into a virtual 3D space.

20 Claims, 8 Drawing Sheets

VOLUMETRIC HEAT MAPS FOR INTELLIGENTLY DISTRIBUTING VIRTUAL OBJECTS OF INTEREST

BACKGROUND

Increasingly, human activities are moving to virtual realms. Virtual environments may include three-dimensional (3D) virtual spaces that mimic spatial relationships in the real world without being bound by real-world constraints. In this regard, a designer's imagination is the limit when crafting a virtual realm.

A designer may integrate virtual elements into real-world spaces and installations using multimedia displays. For example, concert venues increasingly present multimedia elements simultaneously with music performances. In some cases, viewers may interact with the 3D virtual space using virtual reality/augmented reality headsets, smart glasses, mobile phones, or the like.

As part of such an immersive experience, a designer may place virtual objects of interest into the 3D virtual space. Control over the placement of these virtual objects may be critical to the story-telling, visual design, or usability of the virtual experience.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
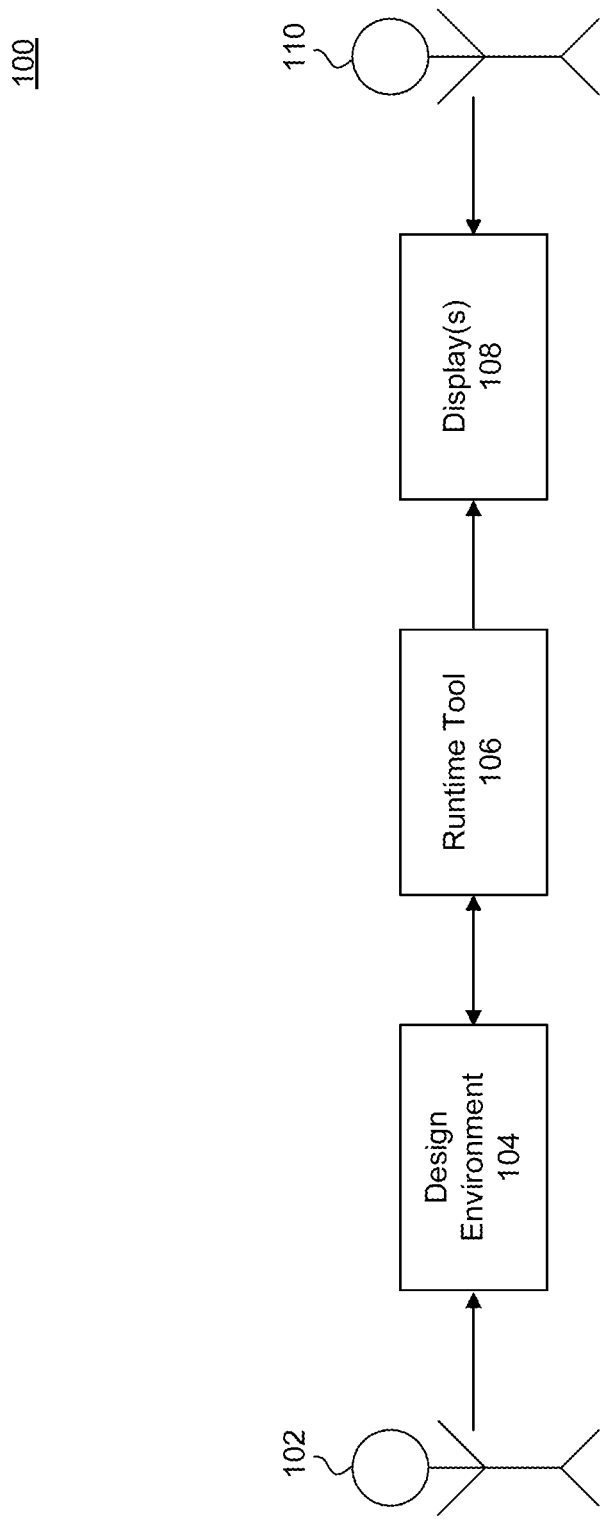
FIG. 1 is a block diagram of an environment having tools to design and present a 3D virtual space that includes virtual objects, according to some embodiments.

Provided herein are system, apparatus, device, method and/or computer program product embodiments, and/or combinations and sub-combinations thereof, for intelligently distributing virtual objects within a 3D virtual space using a voxel-based heat map.

3D virtual spaces are deployed in a wide-array of use cases. In video games, developers create entire 3D worlds for gamers to interact with. Real-world installations may incorporate 3D virtual spaces into immersive multimedia environments. Such installations may be deployed in building lobbies, restaurants, stadiums, movie theatres, etc. With the emergence of the multiverse and metaverse, technologists are finding new ways to facilitate interactions within augmented reality spaces that combine digital and real-world elements. Collaborative design tools may provide 3D virtual spaces to build and edit documents, multi-media files, etc.

A virtual camera may provide a mechanism of interacting with a 3D virtual space. Virtual cameras may employ a viewing frustum—i.e., the region of the 3D virtual space that appears on a screen or viewfinder. The viewing frustum may be obtained by truncating parallel planes of vision. A virtual camera may be interactive or fixed.

An interactive virtual camera allows a user to control or influence the viewing frustum. For example, a user may wear smart glasses, an augmented reality headset, or other suitable device that allows the user to focus on portions of a 3D virtual space in the same way that the user would interact with 3D space in the real world—e.g., by turning their head, looking left and right, etc. A user may also use a controller, mouse, keyboard, remote, or other suitable input mechanism to control the first-person perspective of a virtual camera. Many other suitable control mechanisms exist that allow a user to control an interactive virtual camera. A user may also influence an interactive virtual camera without exerting direct control over the interactive virtual camera. For example, a blob-tracking system may respond to the movement of multiple users by changing the orientation of the interactive virtual camera.

A fixed virtual camera may have a static viewpoint. For example, an installation may provide multiple display screens offering different viewpoints into a 3D virtual space. An installation may be dynamic and changing or static and fixed. A concert venue, for instance, may have multiple screens viewing a 3D virtual space from differing perspectives. In such an environment, a designer may allow viewers to watch an animated dancer or other virtual objects of interest from multiple perspectives depending on which screen the viewer looks at.

A designer may incorporate a variety of virtual objects of interest into the presentation of such an immersive multimedia experience. The types of concepts, objects, devices, beings, ideas, etc. that may be represented as virtual objects are broad and expansive. For instance, a virtual object may be a sword or other item in a game. A virtual object may be a non-player character or other artificial intelligence construct operating within a virtual space. A virtual object may be an animated dancer at a concert, as discussed above. In interactive design environments, a virtual object could be a document, blueprint, painting, drawing, or other suitable file or representation. A virtual object may be graphics-based but may also or alternatively be sound-based, incorporate elements of mixed media, be live based including elements such as video feeds or captured point clouds, or include other appropriate types of media and information.

In legacy systems, virtual objects are typically distributed in a virtual scene before presenting the virtual scene to viewers. The viewers then perceive the virtual objects through the frustum of a virtual camera. This approach may work reasonably well when a single viewer controls the virtual camera (i.e., when the environment includes an interactive virtual camera operated by a single user) because the viewer can manipulate the camera until the virtual object is in their field of view. In such a scenario, the viewer can "go find" the virtual object. Such legacy systems may provide visual, auditory, or other external cues to the viewer to help the viewer find the virtual object.

This technique, however, does not function in situations where the viewer has limited or no ability to manipulate a virtual camera and/or where multiple virtual cameras create disparate (and sometimes overlapping) fields of view.

While existing systems generally rely on the manual placement of virtual objects, some systems attempt to augment this technique by providing virtual objects with some level of goal-oriented intelligence. For example, a virtual non-player character may attempt to approach a viewer in virtual space and orient themselves to be seen. However, this approach does not work when the viewer has limited or no direct control of the virtual camera (i.e., cannot rotate or move to see all of the virtual space). This approach also does not address the full-range of virtual object types. Nor does the approach provide sufficient creative control to a designer to handle many types of design scenarios.

These legacy systems do not address situations having multiple, independent virtual cameras. For multi-camera scenarios, legacy systems typically make no effort to place the virtual object. Instead, such systems customarily move viewers in virtual space to a desirable field of view prior to placing the virtual object.

A technical benefit over these legacy systems may be realized by intelligently placing a virtual object into a 3D virtual space using a voxel-based heat map. The approach partitions any 3D virtual space into a grid of equal-sized cubes referred to as voxels.

Each voxel may be assigned a weight. Voxels may have an initial weight. A voxel may begin as zero or another constant. Or initial voxel weights may be pre-populated by a designer (similar to how virtual objects are traditionally distributed in a scene). Additionally, designers may set voxel weights manually at particular points in time as a design scenario progresses.

As a virtual camera (or multiple virtual cameras) interacts with a virtual 3D space, voxels that fall inside the field of view (defined by the virtual camera's projected frustum) are assigned higher weights than those that fall outside the field of view. Voxels within the field of view may additionally be given extra weight based on their proximity to the field of view center or other highly weighted voxels. As time elapses, voxel weights may be sampled as a moving average of proximal voxels. This creates a natural decay where the weights of voxels outside the field of view eventually fall to zero.

When viewed as a whole, this approach to weighting the voxels creates a heat map of the 3D space. This heat map may then be used by designers to guide the placement of new virtual objects. For example, a virtual object may be placed in regions of high density to ensure that the user (or a largest percentage of viewing users) may view the virtual object upon placement. Conversely, a virtual object may be placed in a region of low density to ensure that the virtual object is initially hidden from view.

In the case of multiple virtual cameras, individual voxel weights may be sampled more than once depending on the virtual cameras' orientation. This biases the algorithm to favor voxels that fall inside overlapping fields of view projecting from different virtual cameras. In other words, the more virtual cameras viewing a voxel, the higher the weight in the heat map will be for that voxel. In another approach, each virtual camera may be assigned a different weight. For example, a virtual camera associated with an "important" person may add more weight (e.g., 2-10 times) to the voxels viewed by this virtual camera as compared to a virtual camera associated with a "normal" virtual camera. This can increase the likelihood of an optimal experience for the "important" person.

This approach is highly flexible and scalable. A designer may exude creative control over the placement of the virtual object across a panoply of virtual spaces using parameters that reference the voxel-based heat map. For example, a designer may configure a time in a timeline to place a virtual object and whether to place the virtual object in a region of the heat map having a high or low density. A designer may also "paint" onto virtual terrain to assign initial values to the voxels in the painted regions. As discussed in the various examples provided below, these techniques allow designers to address the full gamut of story-telling scenarios involving the placement of a virtual object into a virtual 3D space.

FIG. 1 is a block diagram of environment 100 having tools to design and present a 3D virtual space that includes virtual objects, in accordance with some embodiments. Any operation discussed herein may be performed by any type of structure in the diagram, such as a module or dedicated device, in hardware, software, or any combination thereof. Any block in the block diagram of FIG. 1 may be regarded as a module, apparatus, dedicated device, general-purpose processor, engine, state machine, application, functional element, or related technology capable of and configured to perform its corresponding operation(s) described herein. Environment 100 may include designer 102, design tool 104, runtime tool 106, display(s) 108, and viewer 110.

Designer 102 may be an individual building a virtual experience presenting a 3D virtual space that may include virtual objects. For instance, designer 102 may build an installation that integrates virtual elements into real-world spaces and installations using multimedia displays. For example, designer 102 may story-board multimedia elements to present in a concert venues simultaneously with music performances. As another example, designer 102 may build customer multi-media elements to present in a spherical presentation space (such as described below in FIG. 4). Designer 102 may build an interactive environment, e.g., a game or collaborative design environment. Designer 102 may build tools and spaces for use in an augmented reality space or in the metaverse. In an embodiment, designer 102 may connect to design tool 104 using a suitable network such as the Internet, a local area network (LAN), a wide area network (WAN), a wireless network, a cellular network, or various other types of networks as would be appreciated by a person of ordinary skill in the art. In an alternative embodiment, design tool 104 may be executed and accessed on a local device operated by the user, such as a desktop, laptop, cellular phone, or the like.

Design tool 104 may allow designer 102 to build, edit, and deploy an immersive multimedia experience leveraging a 3D virtual space. Design tool 104 may provide a graphical design environment that facilitates the building, editing, deploying, and maintaining of interactive multimedia experiences in virtual 3D spaces. For example, design tool 104 may allow designer 102 to build a virtual 3D space using an appropriate editor. Design tool 104 may allow designer 102 to import a virtual 3D space built in an external tool. Experiences created using design tool 104 may be linked together using the Internet or other suitable network such that experiences interact with one another or draw upon elements of other experiences. Design tool 104 may allow designer 102 to specify a timeline of events within the virtual 3D space. For example, design tool 104 may allow designer 102 to have a virtual object appear at a certain point in time and in a particular place using the techniques described in further detail below.

Specifically, design tool 104 may allow designer 102 to specify parameters that control when and where the virtual object appears in the virtual space. As discussed below, the parameters may specify placement parameters that consider a heat map (discussed below as heat map 206). For example, design tool 104 may allow designer 102 to specify a time in a timeline to place the virtual object and whether to place the virtual object in a region of the heat map having a high or low density. Design tool 104 may allow designer 102 to configure the number of virtual cameras and viewpoints and to change this information as time progresses within a timeline. Design tool 104 may be used to synchronize happenings within the virtual space with additional media—e.g., music, videos, etc. Design tool 104 may allow designer 102 to specify a preferred direction—e.g., an NPC may be placed in a way as to be looking toward the most users or biased toward a specific default rotation.

Design tool 104 may also allow designer 102 to specify a set of initial weights for voxels in a virtual space. For example, designer 102 may specify high weights in an area of the virtual space where the designer would like a virtual object to appear. Moreover, designer 102 may specify a parameter for these weights that indicates how quickly the initial weights should decay, for example when a voxel is determined to fall outside the field of view of all or most virtual cameras present in the virtual space. Designer 102 may also specify a point in time at which a static weight should be applied and the weight to apply to those voxels. This provides additional creative control to the designer and accounts for additional design scenarios. For example, during a concert presenting a 3D virtual space through multiple displays (e.g., as discussed below with reference to FIG. 5), the designer may want virtual objects to display on a particular screen at a certain point in time (e.g., when a musician begins a solo). In this scenario, designer 102 may specify a high weight for the voxels near to the soloist in the virtual space at a time when the soloist performs. This would cause the algorithms discussed in further detail below to create virtual objects near to the soloist, drawing the attention of the viewers in that direction.

Runtime tool 106 may implement a multimedia experience designed in design tool 104. Runtime tool 106 may render the 3D virtual space, interactive components, and virtual objects. Runtime tool 106 may control the timeline of the designed experience and, for example, cause virtual objects to display in accordance with parameters specified by designer 102 in design tool 104. As discussed below, runtime tool 106 may place virtual objects using heat map 206 and designer-specified parameters.

Display(s) 108 may be one or more may be screen displays, virtual headsets, augmented reality devices, smart glasses, mobile device, computer-associated displays, or other suitable devices that may present video, audio, multimedia, and other media. Display(s) 108 may be associated with a virtual camera (e.g., virtual camera 202B) that provides a viewpoint into virtual space 201. In some embodiments, display(s) 108 are static. But in other embodiments, display(s) may be dynamic—either controlled directly by the viewer or controlled as part of the multimedia experience created by designer 102. Several exemplary arrangements providing further detail about possible arrangements and configurations of display(s) 108 are provided below with reference to FIGS. 4-6. Display(s) 108 may also interact with a spatialized audio system—e.g., an NPC may "call out" to viewers who fall to attract their attention to the voxels where the NPC instantiates.

Viewer 110 may an individual viewing a multimedia experience designed in design tool 104 and presented on display(s) 108 by runtime tool 106. For example, viewer 110 may be a patron of a concert venue, a watcher of media presented on a spherical exterior display system, a customer in a restaurant, a user of a collaborative design tool, augmented reality tool, or visitor to the metaverse. Many other types of viewers across numerous use cases may be served by the techniques for placing virtual objects described in further detail below.

Figure 2:
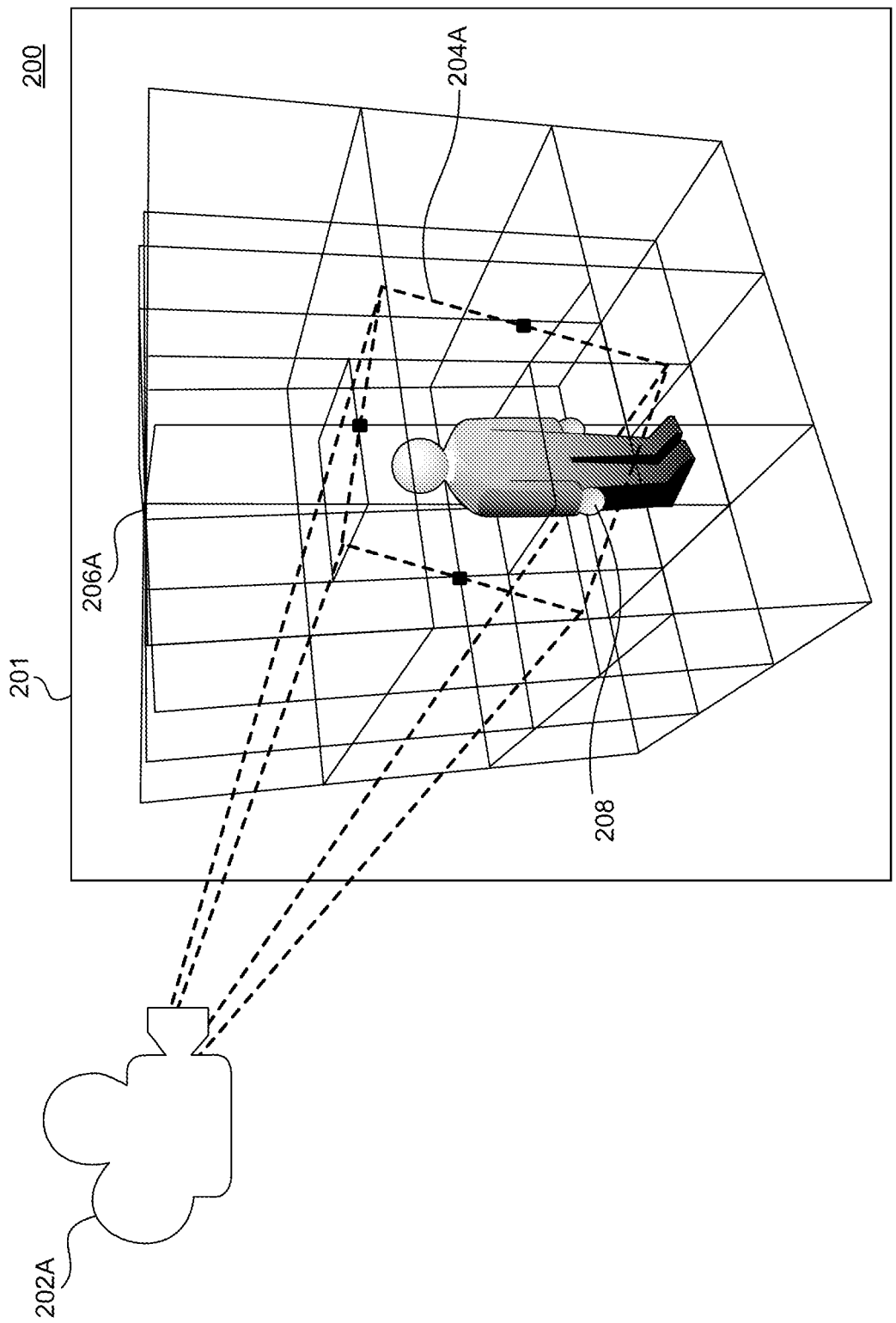
FIG. 2 illustrates a virtual environment having a single virtual camera, according to some embodiments.

FIG. 2 illustrates a virtual environment 200 having a single virtual camera, according to some embodiments. Virtual environment 200 may include virtual space 201, virtual camera 202A, frustum 204A, heat map 206A, and virtual object 208.

Virtual space 201 may be a multi-dimensional environment, world, area, zone, etc. constructed and presented using computer technologies to mimic spatial relationships in the real world without being bound by real-world constraints. Virtual space 201 may be entirely virtual or a hybrid of virtual and real-world elements. For example, virtual space 201 may be a 3D world in a video game, a location within a/the multiverse, a location in an augmented reality space, a tableau in a shared design tool or other collaborative workspace, or a zone incorporated into an immersive multimedia media environment that may be deployed in building lobbies, restaurants, stadiums, theatres, casinos, cruise ships, immersive installations (indoor or outdoor), music festivals (indoor or outdoor), theme parks, attraction queues, aircraft or other non-windowed vehicles, window overlays, airports or transit terminals, yachts, simulators, escape rooms, doctor's offices, any place having a small aquarium, aquariums, zoos, science centers, high end retail, video conferencing rooms, and other spaces. In one embodiment, virtual space 201 may be presented on a spherical exterior display system such as that described below with reference to FIG. 4.

Virtual space 201 may be pixelated or voxelated—i.e., divided into a grid of equal-sized cubes known as voxels. The position of a voxel in virtual space 201 may be encoded relative to other voxels in virtual space 201. Voxels may be of varying sizes, determined automatically or with the aid of a designer, to allow the techniques to scale based on a size of virtual space 201.

Virtual camera 202A may provide a mechanism that allows viewer 110 (or multiple viewers) to interact with virtual space 201. In one embodiment, virtual camera 202A may be interactive, allowing viewer 110 to control and manipulate the camera perspective. For example, viewer 110 may wear smart glasses, an augmented reality headset, or other suitable device that allows viewer 110 to focus on portions of a 3D virtual space by turning their head, looking left and right, moving a handheld device, etc. In another embodiment, the viewpoint of virtual camera 202A may be static—e.g., an installation may provide multiple screens offering differing viewpoints into virtual space 201.

Frustum 204A may be employed by virtual camera 202A to determine the region of the virtual space 201 that appears on a screen or viewfinder. Frustum 204A may be obtained by truncating parallel planes of vision. That is, frustum 204A may consider a position of viewer 110 within virtual space 201, a viewing angle or direction, and a set of z-planes (near and far) to define the near and far bounds of frustum 204A. Frustum 204A may be dynamic and change over time based on the display and movement of the user.

Heat map 206A may be a data visualization of virtual space 201 that indicates a viewing density of the voxels in virtual space 201. Heat map 206A may be created by assigning each voxel in virtual space 201 a weight. An initial weight may for each voxel may be zero or other constant or may be pre-populated by a designer. As virtual camera 202 interacts with a virtual scene, voxels that fall inside the field of view (defined by frustum 204A) may be assigned higher weights than those that fall outside the field of view. Voxels within the field of view may additionally be given extra weight based on their proximity to the field of view center or other highly weighted voxels. As time elapses in the viewing experience, voxel weights in heat map 206A may be sampled as a moving average of proximal voxels, creating a natural decay where weights of voxels that remain outside the field of view eventually fall to zero. In the case of multiple virtual cameras, individual voxel weights may be sampled more than once depending on the virtual cameras' orientation. This biases the algorithm to rapidly increase the weight for voxels that fall inside overlapping fields of view.

Virtual object 208 may be included in virtual space 201 in accordance with parameters specified by designer 102 in design tool 104. In FIG. 2, virtual object 208 is a human avatar, however, virtual object 208 may be a representation of an expansive array of concepts, items, devices, ideas, etc. within virtual space 201. Just for illustrative purposes, virtual object 208 may be an item used in a game. Virtual object 208 may be a non-player character or other artificial intelligence construct. Virtual object 208 may be a word processing document, blueprint, or other suitable file in a collaborative design tool. Virtual object 208 may present computer graphics or animations. Virtual object 208 may include sound or mixed media elements.

Heat map 206A may be used to guide the placement of virtual object 208 in virtual space 201. For example, virtual object 208 may be placed in a region of high density to ensure that the user (or large percentage of users) may view virtual object 208 upon placement. This could arise in a design scenario in which designer 102 wants virtual object 208 to be viewed by the most possible viewers. Conversely, virtual object 208 may be placed in a region of low density to ensure that virtual object 208 is initially hidden from view. This could arise in a design scenario where designer 102 wants the viewers to have to search for virtual object 208. Many other design/storytelling scenarios may be addressed by designers using this technique—i.e., the technique is highly adaptable, flexible, and scalable.

In FIG. 2, virtual environment 200 has a single virtual camera 202A (and thus a single frustum 204A). Such a use case may be applicable in single-viewer scenarios—e.g., a single viewer interacting with virtual space 201 either statically or interactively. This scenario may arise in gaming, augmented reality, or in an installation having only a single viewpoint into virtual space 201. Or this scenario may allow multiple viewers to view a single screen—e.g., in an installation. In this example, heat map 206A may represent portions of virtual space 201 that the single user is viewing and/or has viewed recently. Heat map 206A may then be used to place virtual object 208 according to a design scenario created by designer 102. For example, designer 102 may desire to create virtual object 208 at a region of high density in heat map 206A to ensure that viewer 110 sees virtual object 208 upon creation. However, as discussed below with reference to FIG. 3, this technique is also applicable in multi-user scenarios and/or scenarios having multiple virtual cameras operating simultaneously.

Figure 3:
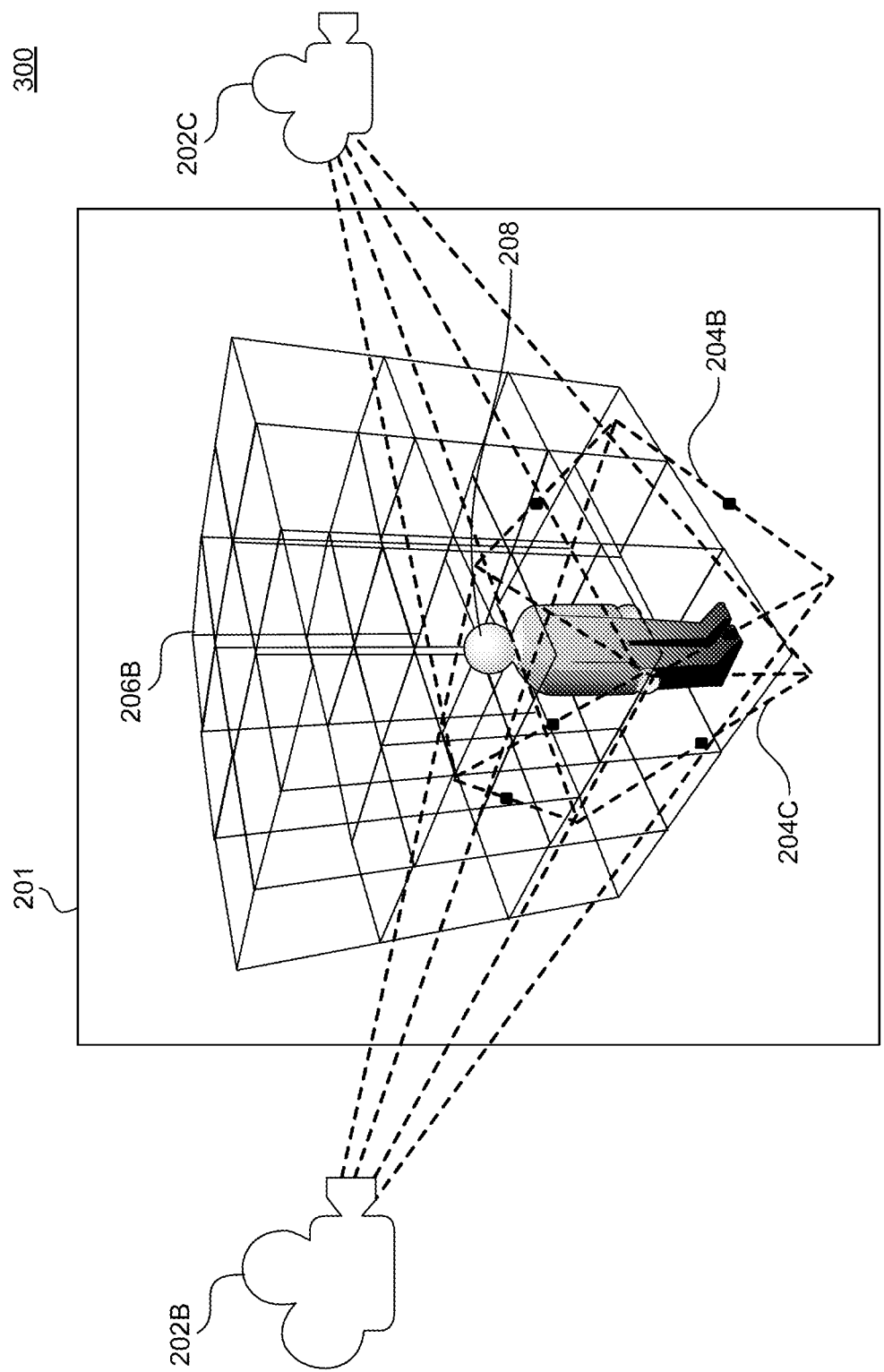
FIG. 3 illustrates a virtual environment having multiple virtual cameras, according to some embodiments.

FIG. 3 illustrates a virtual environment 300 having multiple virtual cameras, according to some embodiments. Such a use case may be applicable where multiple users/virtual cameras simultaneously view or interact with virtual space 201. This scenario may arise in many use cases—e.g., in an installation having multiple viewpoints into virtual space 201. The scenario may arise in augmented reality spaces where multiple viewers each operate an interactive virtual camera.

In this example, heat map 206B may represent portions of virtual space 201 that multiple viewers are viewing or viewed recently. Heat map 206B may then be used to place virtual object 208 according to a design scenario created by designer 102. For example, designer 102 may create virtual object 208 at a region of high density in heat map 206B to ensure that the most possible viewers may view virtual object 208 upon creation. Heat map 206B may be created based on frustum 204C and frustum 204B, corresponding to virtual camera 202C and virtual camera 202B respectively.

Figure 4:
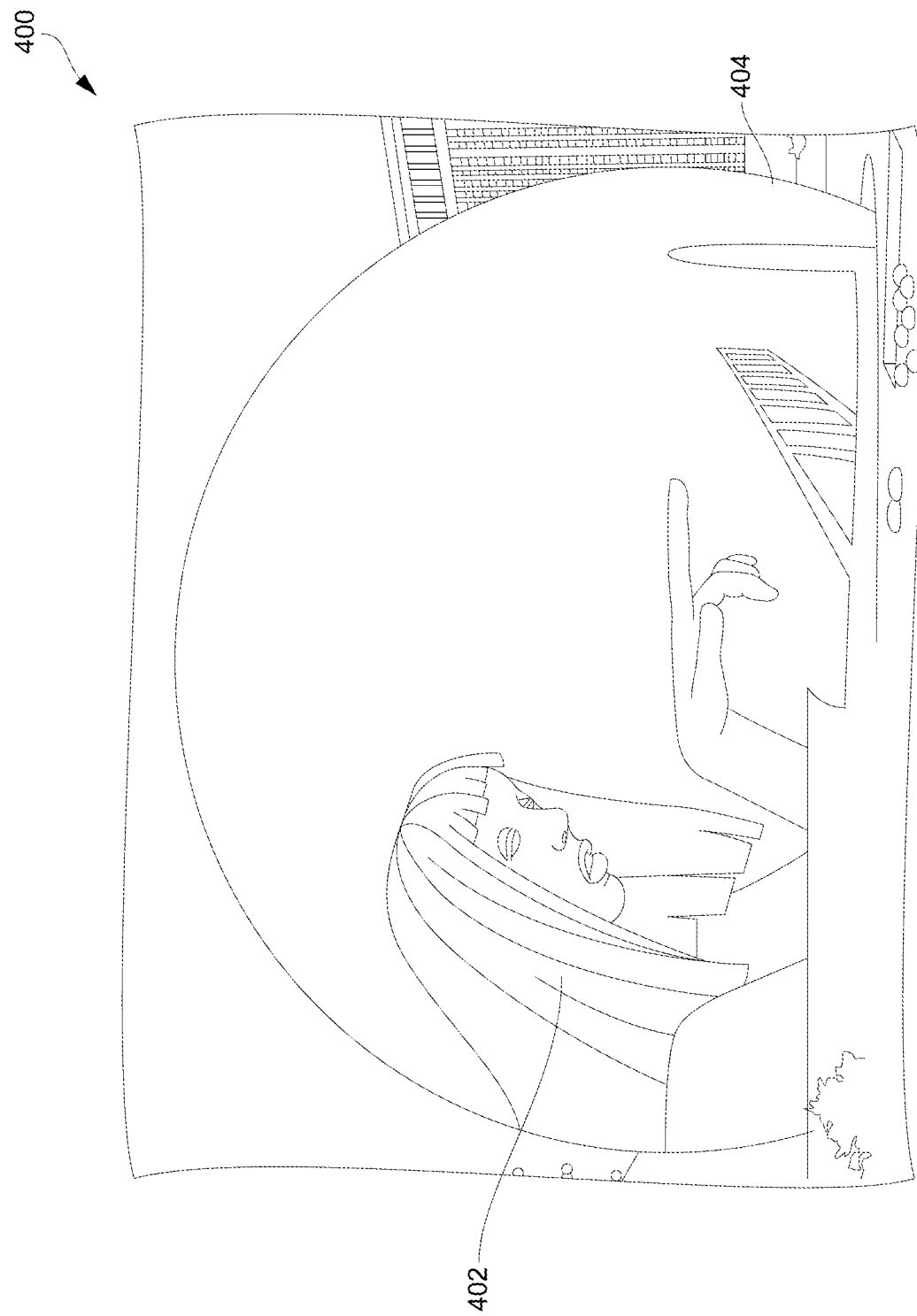
FIG. 4 illustrates a perspective view of an exemplary exterior display system for displaying visual media, according to some embodiments.

FIG. 4 illustrates a perspective view of an exemplary exterior display system 400 for displaying visual media, according to some embodiments. In the exemplary embodiment illustrated in FIG. 4, exterior display system 400 may be configured and arranged to present visual media 402, such as images, pictures, graphics, informational content, live images, moving images, videos, animations, advertisements, promotional content, movies, scenery, light displays and effects, among others. In some embodiments, exterior display system 400 may include electronic visual display device 404 configured and arranged around a building structure and/or a nonbuilding structure or a portion of the exterior surface of the building structure and/or the nonbuilding structure. For example, electronic visual display device 404 may be configured and arranged around an exterior surface of a building structure and/or a nonbuilding structure or a portion of the exterior surface of the building structure and/or the nonbuilding structure.

Generally, the building structure refers to any suitable structure, or structures, that are designed for human occupancy and may include one or more residential, industrial, and/or commercial building structures. The residential building structure may include a single-family detached home, a single-family connected home, and/or a large multi-family home. The commercial building structure may include an office building structure, a non-freestanding retail building structure, also referred to as a shopping mall, a freestanding retail building structure, a hotel building structure, and/or a special purpose commercial building structure such as a self-storage building structure, a theme or an amusement building structure, and/or a theater building structure. The industrial building structure may include a manufacturing building structure, a warehouse/distribution building structure, and/or a flex space building structure, such as an office building, a laboratory, a data center, a call center and/or a showroom. The residential, industrial, and/or commercial building structures may further include specialty building structures, such as educational building structures, including elementary schools, secondary schools, colleges, or universities; civic building structures, such as arenas, libraries, museums, or community halls; religious building structures, such as churches, mosques, shrines, temples, or synagogues; government building structures, such as city halls, courthouses, fire stations, police stations, or post offices; military building structures; and/or transport building structures, such as airport terminals, bus stations, or subway stations. Generally, the nonbuilding structure refers to any suitable structure, or structures, that are not designed for human occupancy and may include one or more residential, industrial, and/or commercial non-building structures. The one or more residential, industrial, and/or commercial nonbuilding structures may include aqueducts, bridges and bridge-like structures, canals, communications towers, dams, monuments, roads, signage, and/or tunnels to provide some examples.

In the exemplary embodiment illustrated in FIG. 4, the building structure and/or the nonbuilding structure may include, be connected to, and/or be surrounded by a mechanical supporting structure configured and arranged about its exterior surface or a portion of its exterior surface. The mechanical supporting structure may be characterized as providing a mechanical lattice framework for forming electronic visual display device 404. As to be described in further detail below, electronic visual display device 404 may be implemented using multiple electronic visual display panels. Each of these multiple electronic visual display panels may include one or more interconnected modular electronic visual display panels having multiple groups of multiple light-emitting diodes (LEDs), also referred to as electronic LED disc assemblies, that are configured and arranged in a series of one or more rows and/or a series of one or more columns. In some embodiments, each electronic LED disc assembly may be characterized as forming a pixel of the electronic visual display device 404.

Multiple electronic visual display panels may be connected to the mechanical supporting structure to form electronic visual display device 404. In some embodiments, the mechanical supporting structure may be configured and arranged to effectively shape the electronic visual display device 404 to be spherical, or spherical-like, in shape as illustrated in FIG. 4. However, those skilled in the relevant art(s) will recognize that the mechanical supporting structure may be configured and arranged differently to cause the electronic visual display device 404 to be any suitable 3D shape, or shape, without departing from the spirit and scope of the present disclosure. This suitable 3D shape, or shape, can include a cube, a rectangular prism, a cone, a cylinder, and/or any combination thereof to provide some examples. In some embodiments, electronic visual display device 404 may have a substantially similar shape as the building structure and/or the nonbuilding structure. For example, the mechanical supporting structure may be connected to a building structure and/or nonbuilding structure having a spherical, or spherical-like, shape. In this example, the mechanical supporting structure may be configured and arranged to effectively shape the electronic visual display device 404 to be similarly spherical, or spherical-like, in shape as the building structure and/or the nonbuilding structure. In some embodiments, the electronic visual display device 404 may have a different shape than the building structure and/or the nonbuilding structure. For example, the mechanical supporting structure may surround a building structure and/or nonbuilding structure having a rectangular prism, or rectangular prism-like, shape. In this example, the mechanical supporting structure may be configured and arranged to effectively shape the electronic visual display device 404 to be spherical, or spherical-like, in shape which is different from the shape of the building structure and/or the nonbuilding structure.

Figure 5:
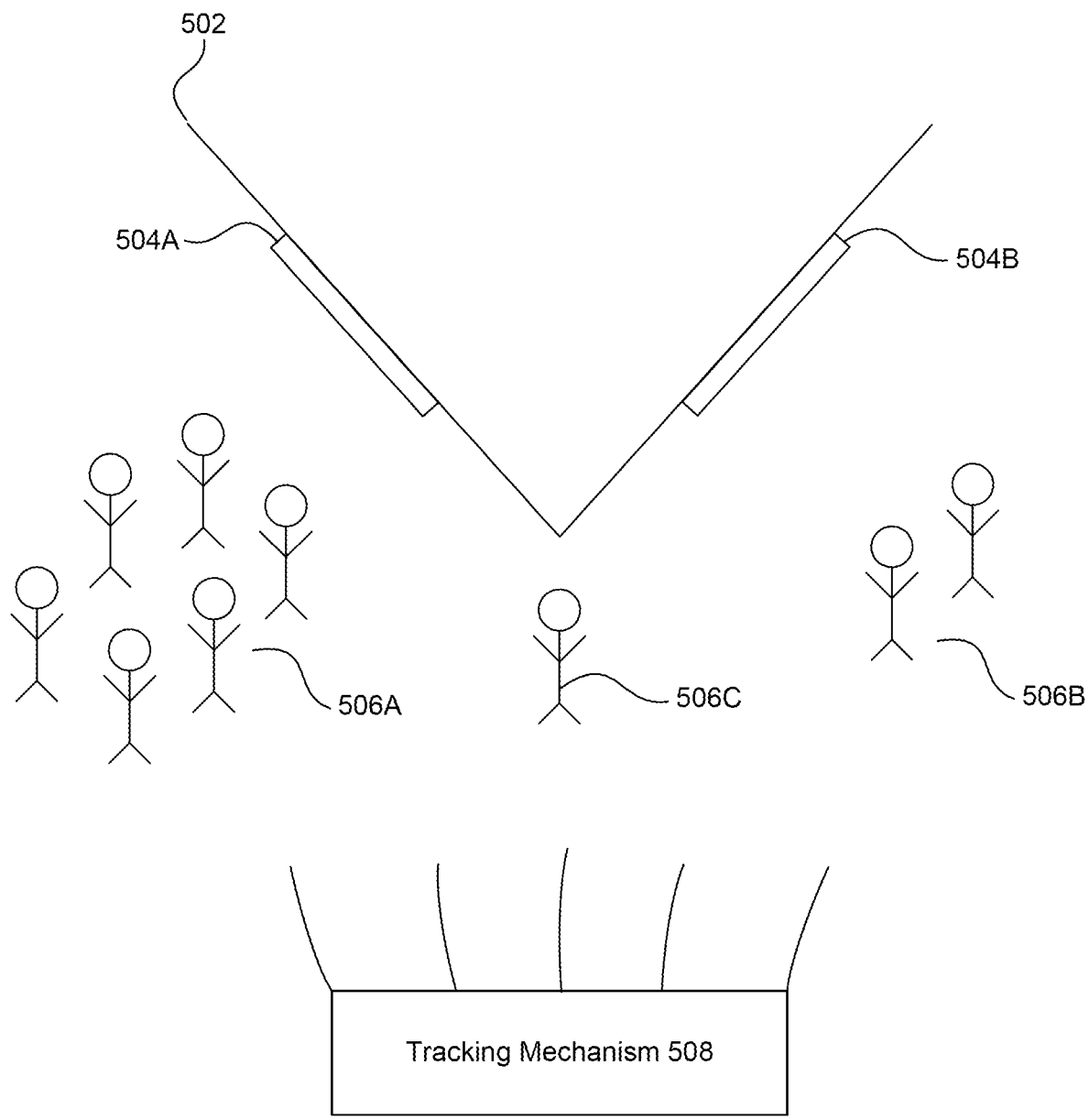
FIG. 5 illustrates an installation having multiple displays for viewing a 3D virtual space, according to some embodiments.

FIG. 5 illustrates an installation 500 having multiple displays for viewing a 3D virtual space, according to some embodiments. Installation 500 may include wall 502, displays 504 such as display 504A and display 504B, people 506 such as people 506A, people 506B, and people 506C, and tracking mechanism 508. Installation 500 may apply in any number of suitable real-world locations, e.g., in such installations may be deployed in concert halls, building lobbies, restaurants, stadiums, movie theatres, and many other public or private spaces. The layout presented in FIG. 5 (the number of displays, people, the wall, etc.) is merely illustrative and is in no way intended to be limiting.

Wall 502 may be a structure in installation 500. Wall 502 may provide a means of dividing installation 500. As illustrated in FIG. 5, wall 502 may serve a function of filtering the viewers that can view particular displays.

Display 504A and display 504B may be screen displays or other suitable multimedia devices that present video and other media to viewers. Display 504A may be associated with a virtual camera (e.g., virtual camera 202B) that examines virtual space 201. Display 504B may be associated with a second virtual camera (e.g., virtual camera 202C) that examines virtual space 201. In this regard, display 504A and display 504B may offer different perspectives into the same virtual space. Displays 504A and display 504B may reflect the viewpoint of static virtual cameras, where the viewpoint into virtual space 201 is fixed. In other embodiments, however, display 504A and display 504B may reflect the viewpoint of interactive virtual cameras.

People 506A-C may be human beings located in installation 500. As reflected in FIG. 5, there may be different numbers of people in different locations of installation 500. For example, in a concert venue, people 506A-C may be sitting in seats and have pre-assigned seating. In other exemplary installations, people 506A-C may be free to move about the space. In FIG. 5, people 506A may view display 504A without being able to see display 504B. Conversely, people 506B may view display 504B without being able to see display 504A. People 506C may be able to view both or neither display 504A and display 504B.

Tracking mechanism 508 may provide an indication of how many people are in the groups of people 506A-C. For example, tracking mechanism 508 may employ blob tracking, eye tracking, face tracking, or tracking based on an audible volume level to determine the amount of people in position to view display 504A and display 504B respectively. Tracking may also be based on expected numbers of people present in various locations, either initially or at various points in time. Such expected numbers may be determined based on, for example, previously-known statistics, characteristics of the installation, or other input provided by a designer. Moreover, in some embodiments, the techniques described below may allow designer 102 to specify parameters that control the placement of virtual objects that consider the number of people viewing a particular virtual camera.

Figure 6:
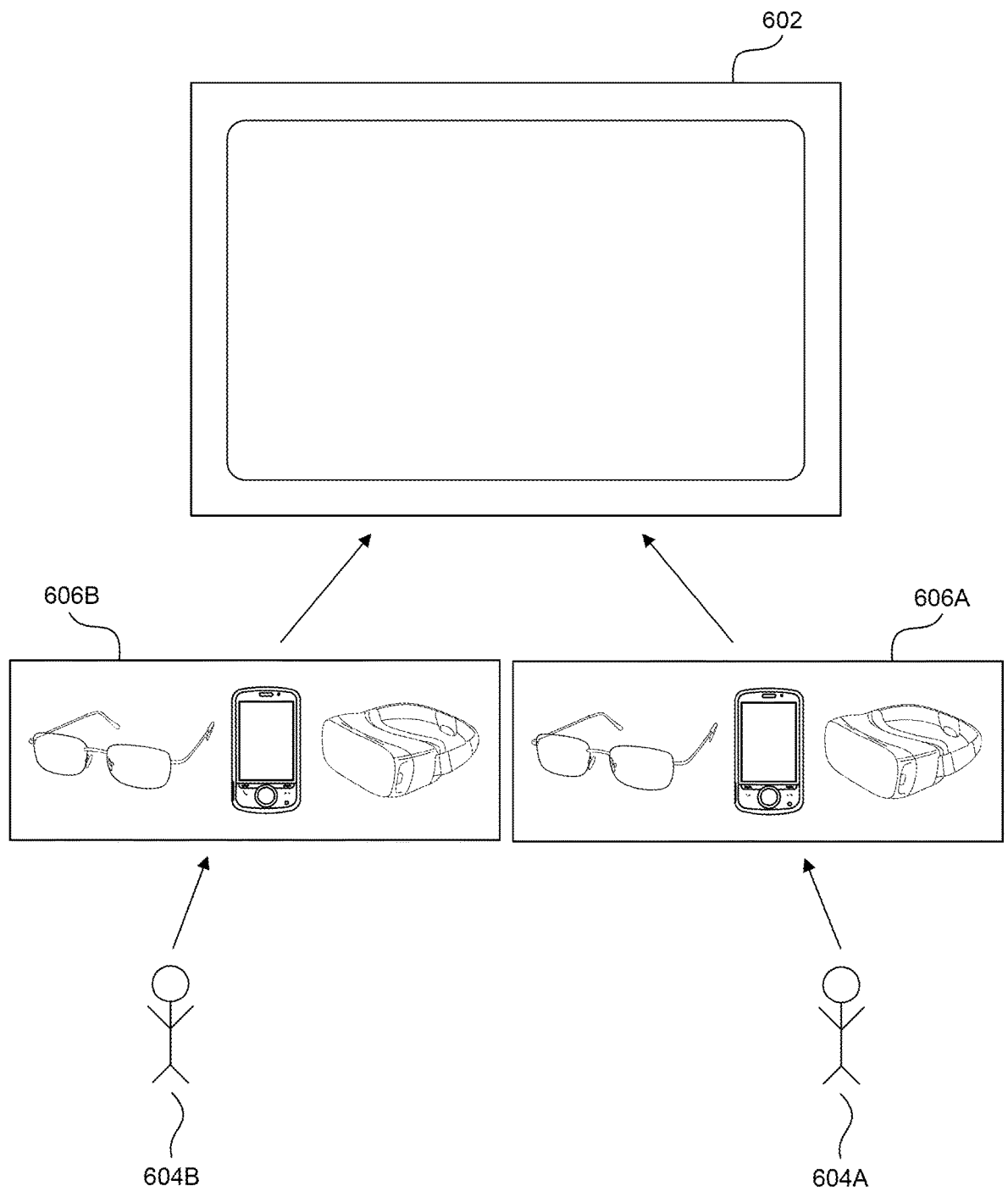
FIG. 6 illustrates an example environment for viewing a 3D virtual space, according to some embodiments.

FIG. 6 illustrates an example environment 600 for viewing a 3D virtual space, according to some embodiments. Environment 600 may include display 602, viewers 604 (viewer 604A and viewer 604B), and devices 606 (device 604A and device 604B).

Display 602 may be a screen displays or other suitable multimedia devices that present video and other media to viewers. Display 602 may be associated with a virtual camera (e.g., virtual camera 202A) that examines virtual space 201. The virtual camera may be static or interactive depending on the design scenario. While FIG. 6 includes display 602, in some embodiments, display 602 may be absent from environment 600. In such an embodiment, virtual space 201 may be interacted with by viewer 604A and viewer 604B using device 606A and device 606B, respectively.

Viewer 604A and viewer 604B may interact with display 602 and a virtual space depicted by display 602. In an alternative embodiment, viewer 604A and viewer 604B may interact with virtual space 201 using only device 606A and device 606B. Viewer 604A and viewer 604B are described in further detail above as viewer 110.

Device 606A and device 606B may be virtual reality/augmented reality headsets, smart glasses, mobile phones, or the like. Device 606A may allow further interaction with the presentation of virtual space 201 on display 602. For example, device 606A may provide an indication of a location of display 602 that viewer 110 is currently examining. Device 606A may further employ eye tracking, face tracking, etc. to determine whether viewer 110 is actively viewing display 602 and the nature of that viewing. Device 606A may provide controls to guide the virtual camera when display 602 reflects an interactive virtual camera. Moreover, in some embodiments, the techniques described below may allow designer 102 to specify parameters that control the placement of virtual objects that consider the information gathered by device 606A.

In one embodiment, device 606A may track data about the attention of viewer 110 when viewing virtual space 201 on display 602. Using this data, runtime tool 106 may determine an effectiveness of placing virtual object 208 in virtual space 201. For example, the system may determine whether the user viewed virtual object 208 when placed by tracking the eye movement of viewer 110.

In an alternative embodiment, device 606A and device 606B may allow viewer 604A and viewer 604B to interact with virtual space 201 through a display provided by device 606A and device 606B. In such an embodiment, display 602 may not be included in environment 600. In such an embodiment, device 606A may present the world through a display included within virtual reality/augmented reality headsets, on a cell phone display, in a display provided by smart glasses, or other display. In such an embodiment, viewer 604A may use device 606A to control a virtual camera. For example, viewer 604A may interact with virtual space 201 by turning their head, looking left and right, moving a cell phone camera, etc. Device 606A may provide additional controls to move forward/backward and left/right within virtual space 201. When device 606A is a mobile device, a suitable interface may be overlaid on top of virtual space 201 to allow viewer 606A to maneuver the virtual camera. In such an embodiment, the techniques described below may allow designer 102 to specify parameters that control the placement of virtual objects that consider information about the virtual camera(s) controlled/viewed by device 606A and device 606B.

Figure 7:
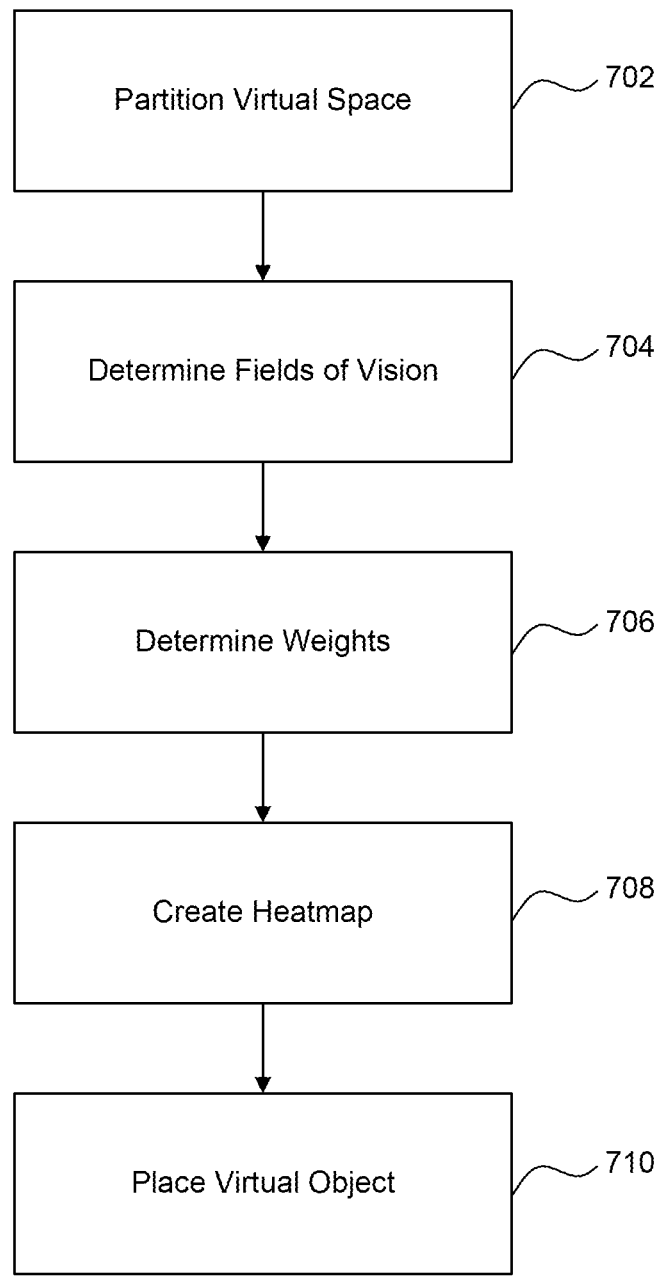
FIG. 7 is a flowchart illustrating a method of placing a virtual object in a 3D virtual space, according to some embodiments.

FIG. 7 is a flowchart illustrating a method 700 of placing a virtual object in a 3D virtual space, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art(s).

In 702, runtime tool 106 and/or design tool 104 may partition virtual space 201 into voxels—i.e., a grid of equal-sized cubes. For example, design tool 104 may allow designer 102 to build a virtual 3D space using an appropriate editor. Design tool 104 may allow designer 102 to import a virtual 3D space built in an external tool. Design tool 104 may allow designer 102 to set a voxel size or scaling factor. Or design tool 104 may select an appropriate voxel size based on the size of the virtual 3D space or other suitable factors. In one embodiment, designer 102 may set initial weights for the voxels in virtual space 201 to exert creative control over the placement of virtual object 208 described in subsequent steps. Initial weights for the voxels may also be set to zero or another constant value.

The subsequent steps (704-710) are iterative and recurring. In other words, runtime tool 106 continues to update heat map 206, determine voxel weights, and determine where virtual object 208 should be placed in virtual space 201 as time progresses and as viewer 110 interacts with virtual space 201.

In 704, runtime tool 106 may determine one or more fields of vision using frustum 204 of virtual camera 202. The field of view may examine particular voxels in virtual space 201. In an embodiment employing a single virtual camera, runtime tool 106 may determine only a single field of view. However, in embodiments employing multiple virtual cameras, runtime tool 106 may determine multiple fields of view.

In 706, each voxel in virtual space 201 may be assigned a weight using the fields of vision determined in 704. As virtual camera 202 (or multiple virtual cameras) examines virtual space 201 over time, voxels that fall inside the field of view (defined by frustum 204) may be assigned a higher weight than voxels falling outside a field of view. Voxels within a field of view may additionally be given extra weight based on their proximity to the field of view center or to other highly weighted voxels. In the case of multiple virtual cameras, voxel weights may be sampled more than once across multiple fields of vision (i.e., multiple frustum 204 for multiple virtual cameras as discussed in FIG. 3). Thus, voxels that fall within overlapping fields of vision may be assigned higher weights than voxels falling within a single field of view or within no fields of view.

In 708, runtime tool 106 may create heat map 206 of virtual space 201 using the weights determined in 706. Heat map 206 may be a data visualization of virtual space 201 that indicates a viewing density of the voxels in virtual space 201. As time elapses, runtime tool 106 may sample voxel weights as a moving average of proximal voxel to create a natural decay. Based on this time decay, voxels that remain outside the field of view will have weights that eventually fall to zero. Runtime tool 106 may use a decay factor specified by designer 102 or select an appropriate decay factor for the design scenario.

In 710, runtime tool 106 may place virtual object 208 in accordance with parameters configured by designer 102 in design tool 104 with reference to heat map 206 generated in 708. This is best illustrated with reference to several exemplary and non-limiting design scenarios that reference the environments discussed in FIGS. 4-6.

In one scenario, virtual object 208 may be placed in a region of high density in heat map 206. This technique ensures that viewer 110 may view virtual object 208 upon placement. Runtime tool 106 may determine a voxel having a highest total value in heat map 206. This voxel may have the largest number of users viewing the location in virtual space 201. Runtime tool 106 may then place virtual object 208 at or near to the voxel having this highest value. Where multiple virtual cameras are deployed, e.g., as displayed in FIG. 3, the technique ensures that a large percentage of users may view virtual object 208 upon placement. In a single user scenario, this technique ensures that virtual object 208 will be placed in viewer 110's viewing frustum.

In another design scenario, virtual object 208 may be placed in a region of low density to ensure that the virtual object is initially hidden from view. Runtime tool 106 may determine a voxel having a lowest total value in heat map 206. This voxel may have the fewest or no viewers viewing this location in virtual space 201. Runtime tool 106 may then place virtual object 208 at or near to the voxel having this lowest value.

This basic scenario may be enhanced in a number of ways to allow additional flexibility and creative control for designer 102. For example, in an installation such as that described in FIG. 5, tracking mechanism 508 may track the number of viewers currently viewing or capable of viewing display 404A and display 404B. Designer 102 may specify a parameter indicating that the largest number of viewers should be able to view virtual object 208 upon placement. In addition to the voxel-based weights in heat map 206, this parameter may consider data from tracking mechanism 508 about actual viewer behavior. This allows runtime tool 106 to determine where to place a virtual object between display 404A and display 404B so that the most viewers may see the object. In the specific exemplary illustration in FIG. 5, this would result in virtual object 208 being placed in virtual space 201 at a location viewed by virtual camera 202 associated with display 504A because more viewers exist in people 506A than in people 506B. But similarly, designer 102 may specify a parameter indicating that virtual object 208 should be placed where there are fewest viewing users.

Additionally, designer 102 may specify a change in the weights that occurs at a particular point in time in a timeline. For example, relative to the spherical display device in FIG. 4, designer 102 may change the voxel weights at a particular point in time such that virtual object 208 will be placed at a particular location in the 3D virtual space presented in the spherical display. This technique may address a design scenario in which virtual object 208 should be placed within view of viewer 110 (i.e., based on high-density placement relative to heat map 206), but then be overridden with the static weight at a certain point in time such that virtual objects are placed at a particular location. In the context of a game, this could move players to a particular area. Or in the context of an installation, it could draw the audience's perspective to a particular zone or area of the installation or performance.

In the example provided in FIG. 6, designer 102 may specify that virtual object 208 should be placed in in the center of the field of view of viewer 604A as tracked by device 606A. In one embodiment, device 606A may track data about the attention of viewer 110 when viewing virtual space 201 on display 602. Using this data, runtime tool 106 may determine an effectiveness of placing virtual object 208 in virtual space 201. For example, the system may determine whether the user viewed virtual object 208 when placed by tracking the eye movement of viewer 110. Runtime tool 106 may then use previously collected data about the effectiveness of placements to inform future decisions about where to place virtual object 208. This allows the system to more intelligently place virtual objects as time passes.

Figure 8:
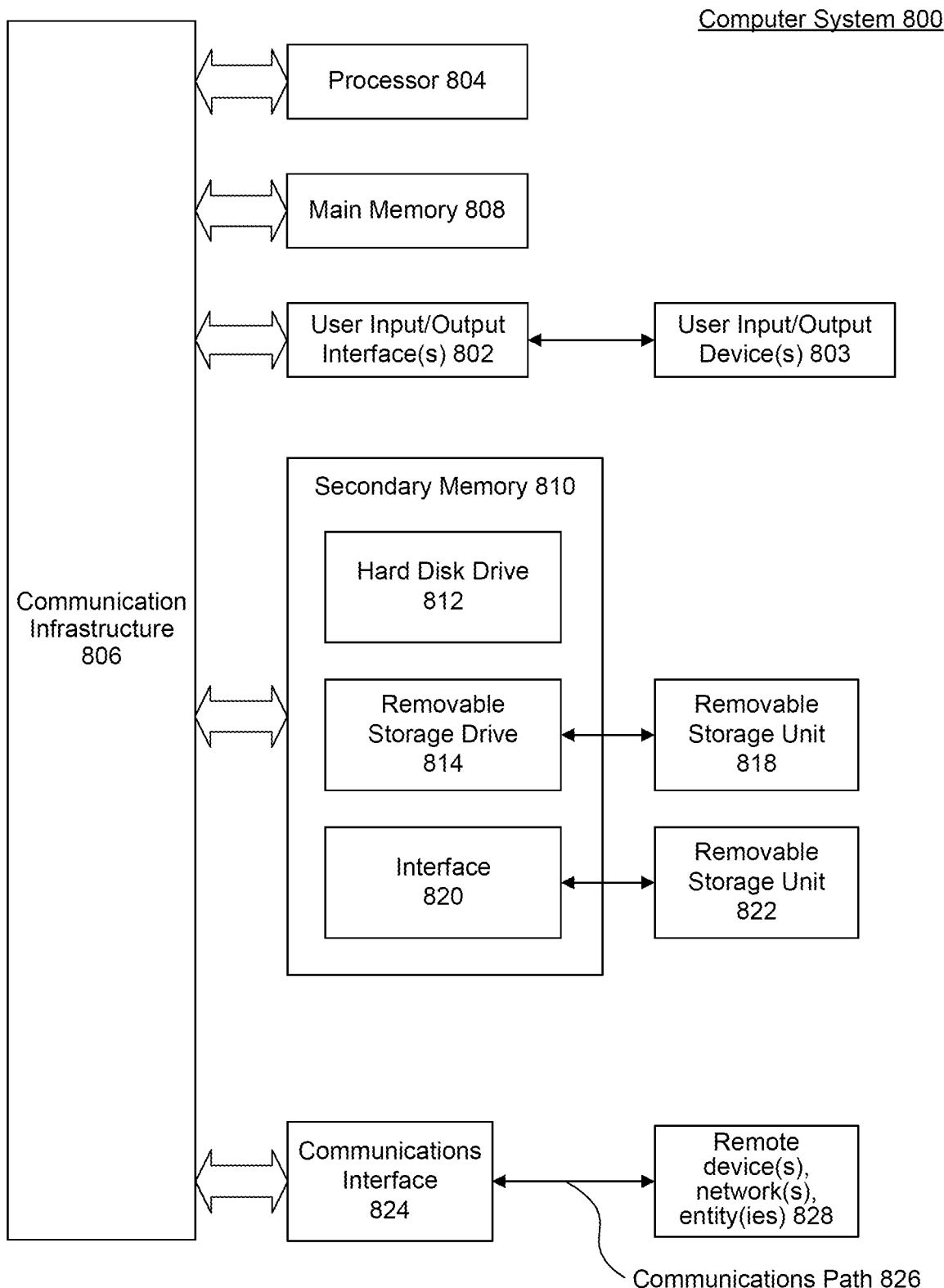
FIG. 8 is an example computer system useful for implementing various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 808, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for placing a virtual object in a 3D virtual space, comprising:
    partitioning the 3D virtual space into a plurality of voxels;
    determining at least one field of view for at least one virtual camera viewing the 3D virtual space;
    assigning a plurality of weights to the plurality of voxels based on the at least one field of view;
    creating a heat map of the 3D virtual space based on the plurality of weights; and
    placing the virtual object into the 3D virtual space using the heat map and a user-configured parameter.

2. The method of claim 1, the creating the heat map further comprising:
    sampling the plurality of weights as a moving average, wherein a weight assigned to a voxel outside of the at least one field of view decays based on a time decay factor.

3. The method of claim 1, the placing the virtual object into the 3D virtual space further comprising:
    determining a voxel in the plurality of voxels having a highest value in the heat map; and
    placing the virtual object at the voxel having the highest value.

4. The method of claim 1, the placing the virtual object into the 3D virtual space further comprising:
    determining a voxel in the plurality of voxels having a lowest value in the heat map; and
    placing the virtual object at the voxel having the lowest value.

5. The method of claim 1, the assigning the plurality of weights to the plurality of voxels further comprising:
    receiving an initial weight for each of the plurality of voxels from a designer;

assigning a vision weight to each of the voxels in the plurality of voxels based on the at least one field of view; and for each voxel in the plurality of voxels, adding the initial weight to the vision weight to determine the weight to assign to each of the plurality of voxels.

6. The method of claim 5, further comprising:
providing a user interface that allows the designer to enter the plurality of initial weights and the user-configured parameter to exhibit creative control over the placing of the virtual object into the 3D virtual space.

7. The method of claim 1, wherein the user-configured parameter indicates a time to place the virtual object and whether to place the virtual object in a region of the heat map having a high or low density.

8. The method of claim 1, wherein the at least one virtual camera is associated with a VR headset, AR glasses, or a mobile device.

9. The method of claim 1, the assigning the plurality of weights further comprising:
determining a center of the at least one field of view; and
increasing the plurality of weights when a voxel in the plurality of weights is at or near the at least one center of the at least one field of view.

10. The method of claim 1, wherein the at least one virtual camera is associated with a display in an installation that provides a viewpoint into the 3D virtual space.

11. The method of claim 10, wherein the installation is a spherical electronic visual display device.

12. The method of claim 10, wherein the installation is in a building lobby, restaurant, stadium, theatre, casino, cruise ship, immersive installation, music festival, theme park, attraction queue, aircraft, airport, yacht, simulator, escape room, doctor's office, aquarium, zoo, science center, or video conferencing room.

13. The method of claim 10, further comprising:
installing a tracking mechanism in the installation that gathers data on locations of at least one person in the installation, wherein the user-configured parameter considers the data on locations of at least one person for use when placing the virtual object.

14. The method of claim 13, wherein the tracking mechanism includes at least one of: blob tracking, eye tracking, face tracking, and volume level.

15. The method of claim 13, further comprising:
recording a history of user attention using the tracking mechanism; and determining an effectiveness of placing the virtual object into the 3D virtual space based on the history of user attention.

16. A system, comprising:
a memory; and
at least one processor coupled to the memory and configured to:
partition a 3D virtual space into a plurality of voxels;
determine at least one field of view for at least one virtual camera viewing the 3D virtual space;
assign a plurality of weights to the plurality of voxels based on the at least one field of view;
create a heat map of the 3D virtual space based on the plurality of weights; and
place a virtual object into the 3D virtual space using the heat map and a user-configured parameter.

17. The system of claim 16, wherein to place the virtual object the at least one processor is further configured to:
determine a voxel in the plurality of voxels having a highest value in the heat map; and
place the virtual object at the voxel having the highest value.

18. The system of claim 16, wherein to place the virtual object the at least one processor further is configured to:
determine a voxel in the plurality of voxels having a lowest value in the heat map; and
place the virtual object at the voxel having the lowest value.

19. The system of claim 16, wherein to place the virtual object the at least one processor is further configured to:
consider a plurality of initial weights when creating the heat map of the 3D virtual space, wherein the plurality of initial weights can be user-configured or initialized to zero.

20. A non-transitory computer-readable device having instructions stored thereon that, when executed by at least one computing device, cause the at least one computing device to perform operations comprising:
partitioning a 3D virtual space into a plurality of voxels;
determining at least one field of view for at least one virtual camera viewing the 3D virtual space;
assigning a plurality of weights to the plurality of voxels based on the at least one field of view;
creating a heat map of the 3D virtual space based on the plurality of weights; and
placing a virtual object into the 3D virtual space using the heat map and a user-configured parameter.

* * * * *